No. 712,487. Patented Nov. 4, 1902.
W. L. BLACK.
ANTIFRICTION DEVICE FOR SUCKER RODS.
(Application filed Feb. 6, 1902.)
(No Model.) 2 Sheets—Sheet 1.
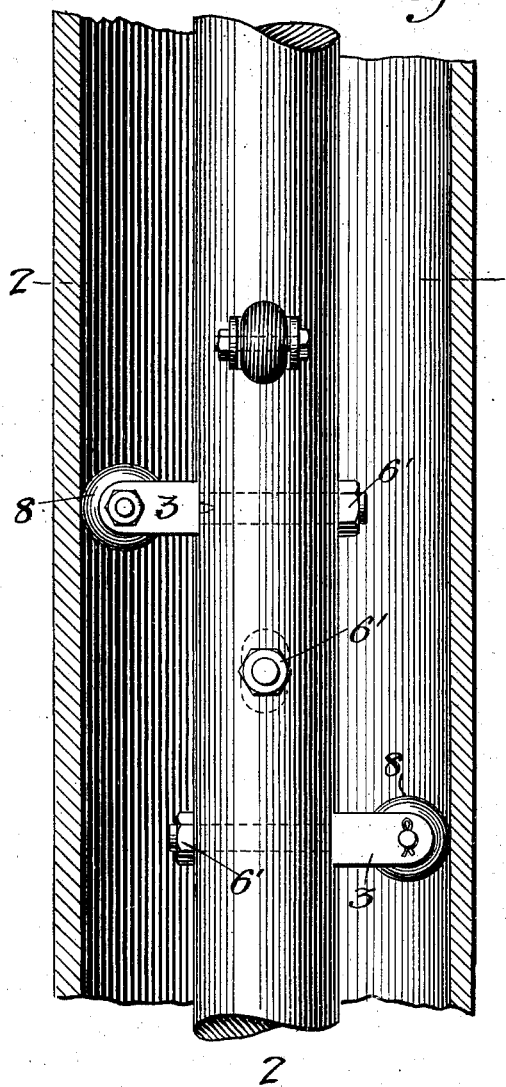
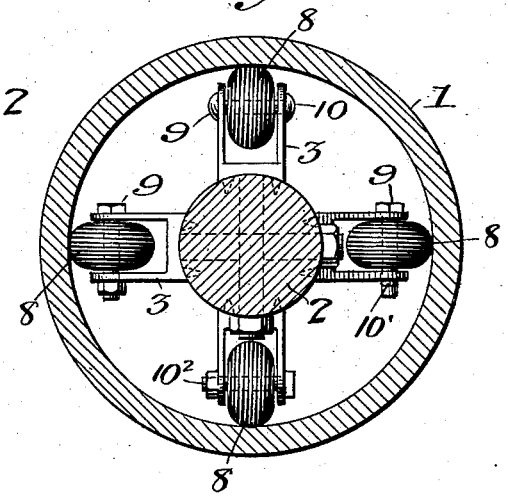
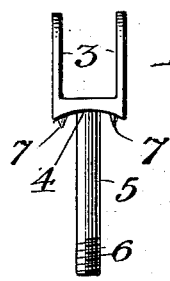
Witnesses:
D. W. Edelin.
Chas. J. O'Neill.
Inventor:
William L. Black,
by Pennie & Goldsborough,
Attys.

No. 712,487. Patented Nov. 4, 1902.
W. L. BLACK.
ANTIFRICTION DEVICE FOR SUCKER RODS.
(Application filed Feb. 6, 1902.)
(No Model.) 2 Sheets—Sheet 2.
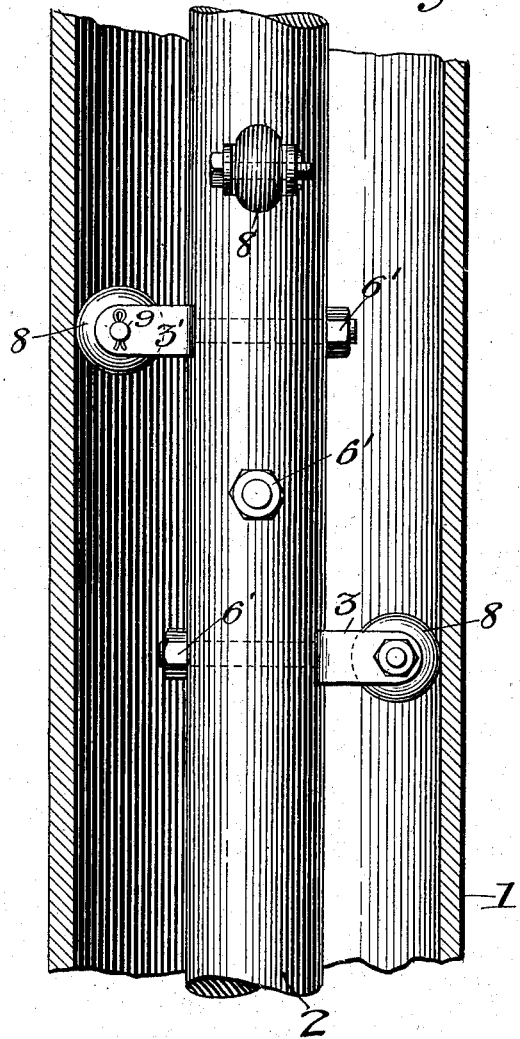
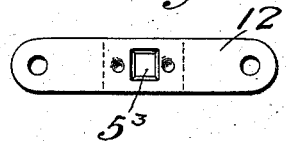
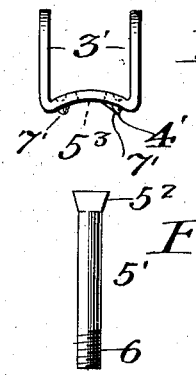
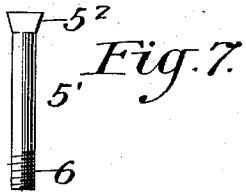
Witnesses:
D. W. Edelin.
Chas. J. O'Neill.
Inventor:
William L. Black,
by Jennie V. Goldsborough,
Attys.

UNITED STATES PATENT OFFICE.

WILLIAM LESLIE BLACK, OF FORT McKAVETT, TEXAS.

ANTIFRICTION DEVICE FOR SUCKER-RODS.

SPECIFICATION forming part of Letters Patent No. 712,487, dated November 4, 1902.

Application filed February 6, 1902. Serial No. 92,888. (No model.)

*To all whom it may concern:*

Be it known that I, WILLIAM LESLIE BLACK, a citizen of the United States, residing at Fort McKavett, county of Menard, and State of Texas, have invented certain new and useful Improvements in Antifriction Devices for Sucker-Rods; and I do hereby declare the following to be a full, clear, and exact description of the invention, such as will enable others skilled in the art to which it appertains to make and use the same.

My invention has for its object to provide an improved antifriction device for use in connection with inclosed traveling rods and the like to reduce the wear occasioned by the rubbing of the rod in its casing, to maintain the rod in its proper central alinement in the casing, and at the same time to so far reduce the area of said antifriction device which projects from the rod as to interpose the least possible obstruction to the free passage of material in the casing.

My invention is illustrated in the accompanying drawings, in which—

Figure 1 is a vertical sectional view of a well-casing, showing the sucker-rod with my improved antifriction device applied thereto. Fig. 2 is a horizontal section on line 2 2 of Fig. 1. Fig. 3 is a detail view of the support for the antifriction-roller forming an essential part of my invention. Fig. 4 is a view corresponding to that shown in Fig. 1 and illustrates a modified form of my invention. Figs. 5, 6, and 7 are detail views illustrating the manner of constructing the roller-support.

Referring to the drawings, Figs. 1 and 2, the numeral 1 indicates a section of a well-casing, in which reciprocates a sucker-rod 2. Both the casing and the rod are formed of successive sections united by couplers, as will be apparent to any one skilled in the art. The great length of the sucker-rod when employed in connection with very deep wells causes it to vibrate laterally and also to rub against the side of the casing, which wears out both the rod and the casing where the parts come in contact. In order to obviate these difficulties and maintain the proper central alinement of the rod with respect to the casing and also prevent any contact between the rod proper and the casing, I attach to the rod my improved antifriction devices at such intervals along said rod as the circumstances of the case may require. These antifriction devices comprise a support for an antifriction-roller consisting of a fork-like head having two tines 3, united by a base portion 4, from which projects a shank 5 in the form of a bolt screw-threaded at its outer end. The outer ends of the tines 3 are provided with suitable bearings to receive the journal-pins or gudgeons 9, which support the roller-bearings 8. The rear face of the base portion 4 of the fork-like portion of the support is concaved or hollowed to conform to the surface of the rod, and I preferably provide this rear face with two projecting spines or nibs 7, which are forced into the material of the rod.

In applying my invention to its intended use a section of the sucker-rod before it is coupled up is bored at appropriate intervals with diametrical holes to receive the shanks 5 of the antifriction device. These antifriction devices are secured in place by suitable nuts 6', which are turned upon the shank and draw the base of the fork 4 firmly against the surface of the rod and force the spines 7 into the body of the rod, thereby preventing any rotary motion of the support with respect to the rod.

It will be obvious, of course, that my antifriction devices may be arranged in any sequence, order, or interval along the rod; but where the well-casing is comparatively straight it is advantageous to apply the consecutive antifriction-rollers so that they will project radially from the rod in a regular series, each member of which occupies a position at right angles to its adjacent fellows. In Figs. 4 to 7 I illustrate a slight modification of my invention, which differs only from that hereinbefore described in features of construction, as the mode of application and operation thereof is practically identical with the aforesaid device. In this form of my device I construct the support of a blank 12, of sheet metal, which is adapted to be bent up to form tines 3', united by a concave base portion 4', having a squared countersunk opening $5^3$, adjacent to which are two nibs 7, struck up from the sheet metal. The outer ends of the tines 3 are perforated, as before, to receive the journal-pins of the antifriction-rollers. The shank portion of the support is separate from the fork and comprises a bolt 5', having the usual screw-threaded end 6 and a tapered square head $5^2$, adapted to engage and be firmly held within the countersunk hole $5^3$ in the base of the fork. In this form of my invention each fork is formed as in Fig. 6 and the bolt 5' dropped into place in the hole in the bottom of the fork, after which the roller-bearing is mounted in the proper position in the fork upon its journal-pin 9, which is then secured in place by any proper means—as, for instance, by upsetting the end of the journal-pin or by means of a cotter or a nut, as fully illustrated at 10, 10', and $10^2$ in Fig. 2 of the drawings. My device thus constructed is applied to the sucker-rod as in the preceding case by passing the shank 5' through suitable holes drilled or bored through the sucker-rod and engaging the screw-threaded ends of the shank by nuts 6'.

It will be apparent that my antifriction device is of such a character that it may be quickly applied to and removed from the sucker-rod, and while it subserves all the purposes of the more complicated forms of antifriction devices heretofore employed it is of such small dimensions that it offers very little obstruction to the flow of material in the pipe.

Having thus described my invention, what I claim is—

1. An antifriction device for sucker-rods and the like, comprising an antifriction-roller, a support in which said roller is journaled, and a shank projecting from said support and adapted to be secured to the rod in an orifice in the body thereof.

2. An antifriction device for sucker-rods and the like comprising an antifriction-roller, a support in which said roller is journaled and a bolt secured in and projecting from said support, said bolt being adapted to be secured to the sucker-rod in an orifice in the body thereof.

3. An antifriction device for sucker-rods and the like, comprising an antifriction-roller, a yoke in which said roller is journaled, and a shank projecting from said yoke and adapted to be secured to the sucker-rod in an orifice in the body thereof.

4. An antifriction device for sucker-rods and the like, comprising an antifriction-roller, a yoke in which said roller is journaled, and a bolt passing through a hole in the base of the yoke and adapted to be secured to the sucker-rod in an orifice in the body thereof.

5. The combination with a sucker-rod, of a series of antifriction devices, comprising a series of antifriction-rollers, yokes in which the respective rollers are journaled, and shanks projecting from said yokes and secured to the rod in orifices in the body thereof.

6. The combination with a sucker-rod, of a series of antifriction-rollers arranged in zigzag or stepped order about the rod, whereby obstruction to the free passage of material in the casing is correspondingly reduced.

In testimony whereof I affix my signature in presence of two witnesses.

WILLIAM LESLIE BLACK.

Witnesses:
JAS. A. CHAMPIE,
W. R. TOMLINSON.